Sept. 21, 1926.
C. C. CARPENTER
1,600,397
ELECTROLYTE FOR ELECTROLYTIC CELLS
Filed June 5, 1922
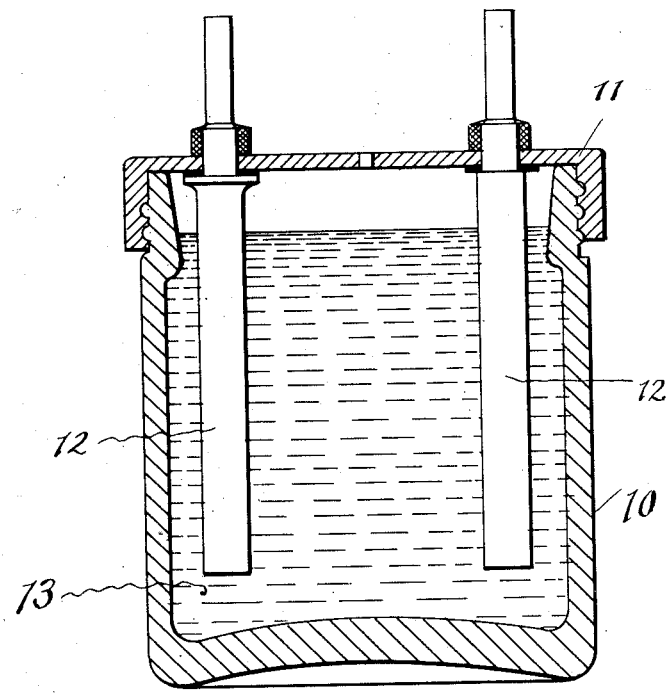
Electrolyte containing One or More Potassium Salts and a Citrate
Inventor
Campbell C. Carpenter
Thurston Kwis & Hudson
attys.

Patented Sept. 21, 1926.

1,600,397

UNITED STATES PATENT OFFICE.

CAMPBELL C. CARPENTER, OF EAST CLEVELAND, OHIO, ASSIGNOR TO WILLARD STORAGE BATTERY COMPANY, OF CLEVELAND, OHIO, A CORPORATION OF WEST VIRGINIA.

ELECTROLYTE FOR ELECTROLYTIC CELLS.

Application filed June 5, 1922. Serial No. 566,112.

This invention relates to electrolytic cells and particularly to an improved electrolyte especially adapted for use in cells employed as rectifiers.

As is well known, a great many substances have the power of forming a film on the electrode of aluminum or other film forming materials and can be used for a time at least in rectifying currents. However, the best electrolytes employed heretofore are not satisfactory in a commercial sense inasmuch as the life of the cell for the rectification of currents is too short. Generally the generation of heat is excessive, leakage is high and premature coagulation of the aluminum salts takes place with rapid etching and crystallization of the film forming electrode.

It is a well recognized fact, therefore, that electrolytic cells, particularly rectifiers, have not been developed to a satisfactory state, and a great deal of work has been done in the way of improving the efficiency, the operation, and life of the cells. Various electrolytes have been proposed and many alleged improvements along mechanical lines have been suggested, there having been particular activity in attempts by various mechanical means or devices to reduce or prevent the so-called "edge effect", i. e. the etching where the film forming electrode emerges from the solution, together with its attendant formation of crystals accompanied by changes in solution concentration and arcing. However, I have found in my study of electrolytic cells that the difficulty cannot be solved along lines directed primarily to the reduction of the edge effect. Furthermore, I have made the important discovery that the difficulty lies primarily with the premature coagulation or deposition of the aluminum salt and with the ease at which the solution crystallizes, and the basis of the present invention is the prevention of this premature deposition and crystallization of the solution. Furthermore, I have discovered that the aluminum salt when formed as the rectifier is initially used is in a colloidal state, and that when maintained in this state and prevented from coagulating, etching is prevented, leakage of current and arcing are practically eliminated or very much reduced, rise of temperature to an objectionable degree is prevented, and the life of the cell working at normal efficiency is very much increased.

Having made the discoveries that the difficulties lie in the premature deposition of the aluminum salt, and that the salt prior to its deposition is in a colloidal state, I have arrived at the solution of the difficulty, i. e. the overcoming of the objections and disadvantages above stated, by providing in the electrolyte a substance or chemical which will prevent the premature deposition or coagulation of the aluminum salt, assuming that a film forming electrode of aluminum is utilized.

In carrying out my invention a citrate such as citric acid which will produce this result may be utilized along with a suitable salt or salts which will combine under electrolytic action with the film forming electrode, which will be assumed to be aluminum. I therefore do not desire to be confined to the specific ingredients or chemicals herein mentioned, but as an example of the ingredients of an electrolyte which have proven to be very effective in a cell having a film forming electrode of aluminum and a conducting electrode of lead or equivalent material I might mention the combination of ammonium phosphate, potassium phosphate and citric acid. Though the proportions may be varied somewhat, I find that very excellent results are obtained with an electrolyte made up of 100 grams ammonium phosphate, 30 grams potassium phosphate, 210 grams citric acid, dissolved in water and diluted to one litre with water.

The citric acid in combination with the two phosphates named produces the nearest to an ideal solution that I have been able to discover. A rectifier provided with this electrolyte will operate for a long period of time, much longer, in fact, than with any other electrolyte of which I am aware. The solution has the very important characteristics of crystallizing with difficulty, and of holding in a colloidal state the aluminum salt and in consequence there is no abnormal corrosion or etching of the aluminum electrode, and no abnormal heating effects are encountered. When after continued use the solution weakens so that rectification ceases, a renewal of the solution is all that is necessary. Of course, the aluminum electrode will finally reduce in size so as to require renewal, but with the electrolyte above mentioned it can be used over a longer period of time than is possible with any other electrolyte of which I am aware.

In the accompanying sheet of drawings, wherein I have shown one of the numerous forms of cells which may be employed advantageously, the single figure is a sectional view.

In the accompanying drawings, 10 represents the jar, 11 the cover therefor, 12 the electrodes which are supported by the cover, and 13 represents the electrolyte.

Changes may be made in the ingredients employed and in the proportions of the ingredients, and I therefore aim in my claims to cover all modifications which do not involve a departure from the spirit and scope of my invention.

Having described my invention, I claim:—

1. An electrolyte for an electrolytic cell containing one or more salts which will combine under electrolytic action with a film forming electrode, and a citrate which will prevent premature coagulation of the salt resulting from the combination of the electrolyte salt or salts with the film forming electrode.

2. An electrolyte for an electrolytic cell having an aluminum film forming electrode, said electrolyte containing one or more salts which under electrolytic action will combine with aluminum and a citrate which will prevent the premature coagulation of the resulting aluminum salt.

3. An electrolyte for an electrolytic cell containing one or more salts which will combine under electrolytic action with a film forming electrode and a citrate which retards crystallization.

4. An electrolyte for an electrolytic cell containing one or more salts which will combine with the film forming electrode under electrolytic action and citric acid.

5. An electrolyte for an electrolytic cell containing one or more phosphates together with a citrate which will prevent premature coagulation of the salt resulting from the chemical combination of such phosphate or phosphates with the film forming electrode.

6. An electrolyte for an electrolytic cell containing one or more phosphates which under electrolytic action will combine with a film forming electrode and citric acid which will prevent premature coagulation of the salt resulting from such combination.

7. An electrolyte for an electrolytic cell containing ammonium phosphate, potassium phosphate and a citrate which will prevent the premature coagulation of the salt resulting from the chemical combination of said phosphates with the film forming electrode.

8. An electrolyte for an electrolytic cell containing ammonium phosphate, potassium phosphate and citric acid.

9. An electrolyte for electrolytic cells containing an aqueous solution of more than 10% concentration of one or more salts which will combine under electrolytic action with a film forming electrode and containing a substance which prevents premature coagulation of the salt resulting from the combination of the electrolyte with the film forming electrode and which retards crystallization.

10. An electrolyte for electrolytic cells comprising a solution containing in excess of 10% of one or more salts which will combine under electrolytic action with a film forming electrode and containing a citrate to prevent premature coagulation of the salt resulting from the electrolytic action and to retard crystallization.

11. An electrolyte for electrolytic cells containing an aqueous solution of more than ten per cent concentration of one or more salts including a phosphate which will combine under electrolytic action with a film forming electrode, and containing a substance to retard coagulation of the salt resulting from the combination of the electrolyte with the film forming electrode.

12. An electrolyte for electrolytic cells containing an aqueous solution of more than ten per cent concentration of one or more salts including a phosphate, and containing a citrate.

In testimony whereof, I hereunto affix my signature.

CAMPBELL C. CARPENTER.